Dec. 31, 1957   A. BOSCHI   2,818,249
SHOCK ABSORBERS
Filed Oct. 15, 1954   2 Sheets-Sheet 1
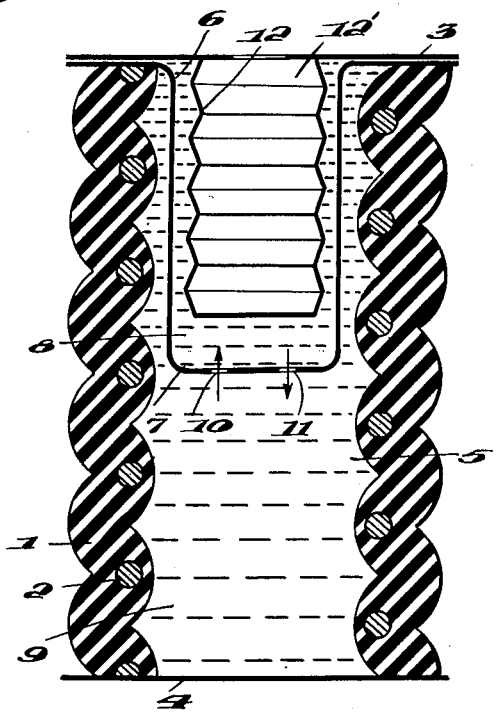
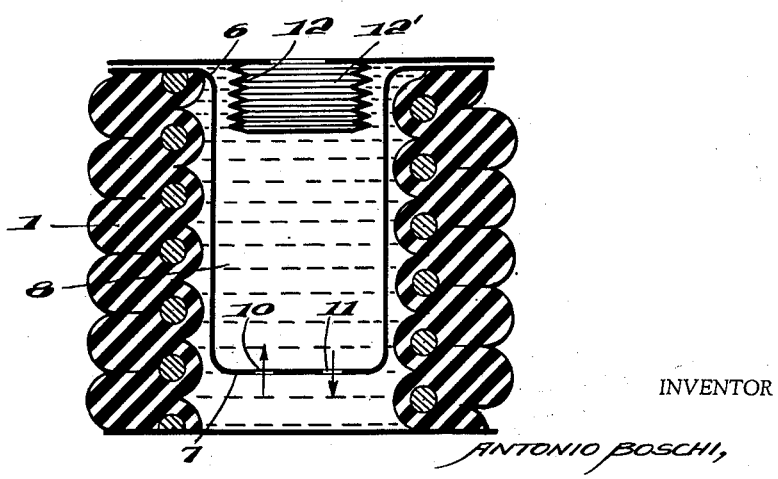
INVENTOR
ANTONIO BOSCHI,
BY Stone, Boyden + Mack
ATTORNEYS Dec. 31, 1957  A. BOSCHI  2,818,249
SHOCK ABSORBERS
Filed Oct. 15, 1954  2 Sheets-Sheet 2
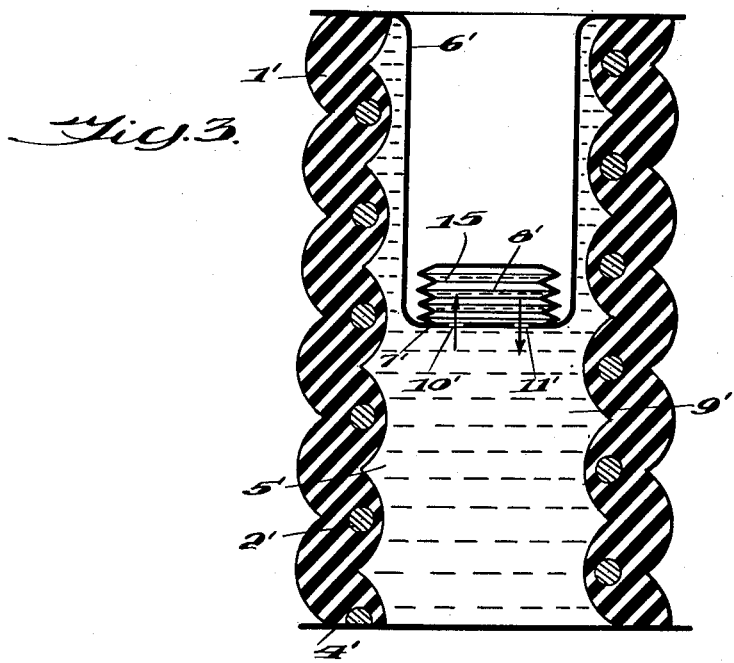
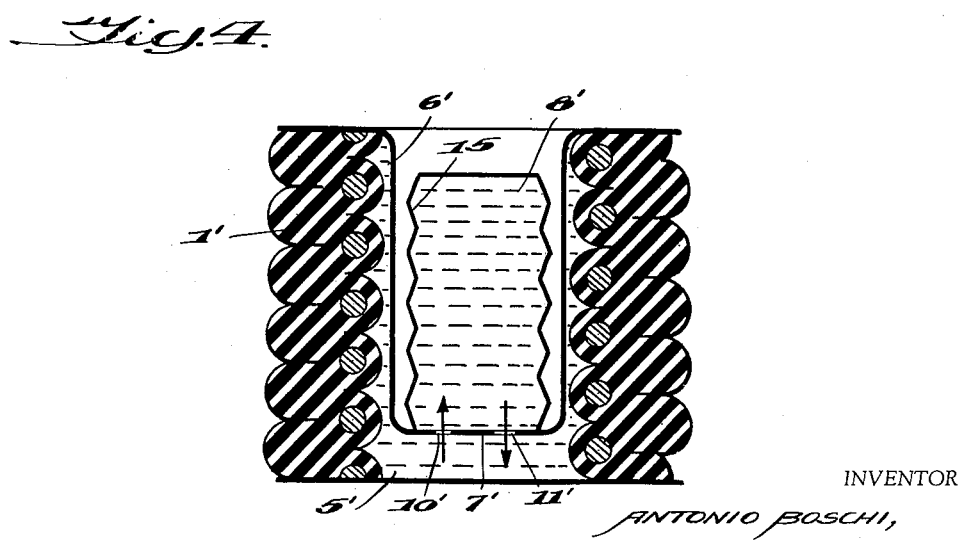
INVENTOR
ANTONIO BOSCHI,
BY Stone, Boyden & Mack
ATTORNEYS

United States Patent Office 2,818,249
Patented Dec. 31, 1957

2,818,249

SHOCK ABSORBERS

Antonio Boschi, Milan, Italy, assignor to Società Applicazioni Gomma Antivibranti S. A. G. A. Società per Azioni, Milan, Italy Application October 15, 1954, Serial No. 462,463

Claims priority, application Italy February 10, 1954

4 Claims. (Cl. 267—33)

This invention relates to impact sustaining elements, and, more particularly, to combination spring-fluid shock absorbers.

A fairly common type of shock absorber includes a spring element mounted between two relatively-movable members, and a fluid damper to oppose and damp out flexures of the spring element. The spring may be any resilient member including the usual steel coiled or leaf springs, rubber springs, or combinations of rubber and metal. The damping fluid might be oil or any other relatively incompressible liquid.

This type of shock absorber generally has a connection between the spring element and a container for the damping fluid controlled by a pair of oppositely-acting, one-way valves, to permit fluid flow from the spring to the container during compression of the spring and to permit reverse flow on expansion. The container, however, is usually only partly-full of the fluid so that, during compression and expansion of the spring, the fluid mixes with air in the container and forms an air-fluid emulsion. Once such an emulsion is formed, the damping characteristics of the fluid change, so that the operation of the shock absorber may be substantially different than that for which the absorber was designed.

In the past it has been suggested to use the spring as the walls of the container for the damping fluid, so that no external container would be needed, and the fluid would flow back and forth between a pair of chambers in the spring during compression and expansion of the shock absorber. However, the difficulty of the formation of air-fluid emulsions, mentioned above, has made it impractical in the past to so combine the spring and fluid container.

The present invention is designed to avoid the formation of air-fluid emulsions during operation of a shock absorber, and also to make it practical to form the fluid container within the spring element, so that a unitary structure is possible.

The apparatus of the present invention, generally speaking, includes a spring element having inner walls defining a pair of chambers for damping fluid, valve means connecting the two chambers, and a collapsible member occupying part of the space within one of the chambers. The collapsible member collapses or distends, depending on the direction of force on the spring element, and constantly fills the volume of the two chambers not occupied by the fluid.

The present invention will now be described in conjunction with the attached drawings, showing preferred embodiments of the invention.

In the drawings:

Fig. 1 is a diagrammatic view of a shock absorber constructed in accordance with the invention, with the spring in normal unstressed condition;

Fig. 2 is a view of the shock absorber of Fig. 1, with the spring in compressed condition;

Fig. 3 is a diagrammatic view of a second embodiment of the invention, with the spring in normal unstressed condition; and Fig. 4 is a view on the shock absorber of Fig. 3, with the spring in compressed condition.

Referring first to Figs. 1 and 2, the shock absorber of this embodiment includes a spring 1, which may be of the combined helical rubber-metal type, having a steel spring 2 embedded in the rubber. The inner wall of spring 1, together with end plates 2 and 4, define an inner container or cavity 5 for damping fluid.

A tubular box-shaped member 6 mounted on end plate 3 extends into container 5 and carries a diaphragm 7. The box-shaped member 6 divides the container into upper and lower chambers 8 and 9, respectively, and inlet valve 10 and return valve 11 in the diaphragm provide for passage of fluid between the two chambers. A pressure deformable or collapsible member 12, preferably of tubular shape with an inner cavity 12', and which may be of rubber or other resilient material, is mounted on end plate 3 and extends into chamber 8 to define the upper end thereof.

In operation of the apparatus of Figs. 1 and 2, when a compressive force is imposed between plates 3 and 4, the spring 1 compresses to the configuration shown in Fig. 2. During this compressive action, chamber 9 decreases in size, so as to force fluid from that chamber through valve 10 into chamber 8. The pressure exerted by this fluid on collapsible member 12 causes that member to collapse and decrease the size of cavity 12' to the extent indicated in Fig. 2, thus increasing the volume of chamber 8 available to the fluid.

On opposite movement of the spring 1, the parts of the apparatus move back toward the position of Fig. 1, the displaced fluid returning into chamber 9 and collapsible member 12 returning toward its unstressed condition.

It will be obvious that since the damping fluid fills all the available volume of both chambers 8 and 9 at all times, there is no space for air in the chambers. The various parts of the assembly are air-tight, so the damping fluid is never exposed to air. Consequently, no air-fluid emulsion is formed during operation of the shock absorber, with the result that the damping characteristics of the fluid remain constant.

In the apparatus of Figs. 1 and 2, the deformable or collapsible member 12 is compressed or squashed during application of compressive forces. This squashing action is wearing on the collapsible member 12 and hastens its destruction. The embodiment of Figs. 3 and 4 is designed to substitute an extension or dilation of the deformable member for the squashing action.

In the apparatus of Figs. 3 and 4, the parts of the shock absorber remain the same as the corresponding parts of Figs. 1 and 2, and so are marked with the same numerals primed. However, the deformable member 15 of Figs. 3 and 4 is normally collapsed, as shown in Fig. 3, and has its lower end attached to the diaphragm 7'. The deformable member itself forms the chamber 8', and the size of that chamber is changed by extension and collapse of the deformable member.

The shock absorber of Figs. 3 and 4 operates substantially the same as that of Figs. 1 and 2, except that fluid enters into deformable member 15 during compression of the spring and causes extension of the member. During opposite action of the spring, fluid exits from the deformable member, allowing it to return to its original collapsible condition.

It will be understood that the shock absorber of this invention is particularly adapted for use with motor vehicles, but that it is capable of use in many other machines and apparatus. It will further be understood that may modifications could be made in the apparatus specifically disclosed herein without departure from the scope of the invention, and specifically, that the deformable chamber could be external of the spring. Consequently, the invention is not to be considered limited to the specific embodiments disclosed, but only by the scope of the appended claims.

I claim:

1. A shock absorber comprising a spring member having a body of resilient material having a length diminished by relative pressure between its opposite ends, said body having internal wall means extending along its length defining an internal cavity in said body, means including said internal wall means defining a pair of interconnected, damping fluid-filled, air-tight chambers confined within the general overall length of said body, one of said chambers having its volume reduced along with reduction of the size of said cavity when the length of said body is diminished, so that fluid flows out of said one chamber and into the other chamber when the volume of said one chamber is reduced, said means further including a pressure-deformable member forming a wall of said other chamber so as to permit increase in the volume thereof when fluid flows into the other chamber, whereby the damping fluid is not exposed to air during its movement between the two chambers.

2. A shock absorber comprising a spring member having a body of resilient material having a length diminished by relative pressure between its opposite ends, said body having internal wall means extending along its length defining an internal cavity in said body, means secured to said body dividing the cavity into a first and second chamber, both air-tight and filled with damping liquid, valve means in said means secured to said body to allow liquid to flow between the two chambers, said first chamber having its volume reduced along with reduction of the size of said cavity when the length of said body is diminished, so that fluid flows out of said first chamber and into said second chamber when the volume of said first chamber is reduced, and a pressure deformable member defining at least one wall of said second chamber to permit increase in volume of said second chamber when the volume of said first chamber is reduced.

3. A shock absorber as defined in claim 2 in which said deformable member is compressible under pressure of said liquid and defines an inner cavity, the external wall of said deformable member defining said wall of the second chamber, so that said deformable member collapses under pressure of the liquid flowing into the second chamber from the first chamber to permit expansion of the volume of the second chamber.

4. A shock absorber as defined in claim 2 in which said deformable member is extensible under pressure of said liquid and defines an inner cavity, the inner wall of said deformable member defining said wall of the second chamber so that said deformable member extends under pressure of the liquid flowing into the second chamber from the first chamber to permit extension of the volume of the second chamber.

References Cited in the file of this patent

UNITED STATES PATENTS

| 1,304,311 | Heldrich | May 20, 1919 |
| 1,516,004 | Eckrode et al. | Nov. 18, 1924 |
| 1,649,643 | Albert | Nov. 15, 1927 |
| 2,640,693 | Magrum | June 2, 1953 |

FOREIGN PATENTS

| 497,008 | Great Britain | Dec. 5, 1938 |
| 581,417 | Great Britain | Oct. 11, 1946 |
| 468,320 | Germany | Nov. 10, 1928 |
| 730,271 | Germany | Jan. 8, 1943 |
| 754,307 | France | Aug. 28, 1933 |